United States Patent Office 3,116,230
Patented Dec. 31, 1963

3,116,230
METHOD OF REFINING WAXES
Clarence M. Doering, Port Arthur, Tex., assignor to Texaco Inc., a corporation of Delaware
No Drawing. Filed Dec. 23, 1958, Ser. No. 782,403
2 Claims. (Cl. 208—26)

This invention relates to the refining of waxes and more particularly to improvements in refining petroleum waxes obtained from paraffin base crude oils.

The paraffin waxes present in crude oil are found in paraffin base and mixed base crude oils in their high boiling distillate fractions. The paraffin waxes are primarily present in the paraffin distillate fraction of the crude which boils from about 600° to about 850° F., and the lube oil fraction boiling from about 800° F. to 1000° F. or more, dependent on the source of and type of crude oil.

In the manufacture of refined paraffin waxes it is known that the waxy portion of the petroleum oil fraction is separated from the oil portion by crystallization such as by chilling the oil to low temperatures with or without the use of a solvent or a mixture of solvents. The precipitated wax formed by chilling the wax-oil mixture is separated from the oil in a conventional manner such as by filtration or by centrifugation and the like.

The separated wax which is referred to as "slack wax" contains a considerable amount of oil present therewith and it is therefore necessary to lower the oil content of the wax in order to produce a satisfactory high quality wax.

The occluded oil can be removed from the slack wax in a number of known ways such as, for example, by "sweating" or by the employment of solvents. Solvent deoiling involves recrystallization of the slack wax from solvents such as ketones, benzol-ketone mixtures, hydrocarbons, chlorinated solvents, and the like. Prior to or subsequent to the solvent deoiling step the wax can be fractionated to the desired melting point ranges.

In deoiling the slack wax by sweating, the warm liquid wax is chilled in pans until it solidifies, then it is heated gradually. During the heating step the entrained oil drains away first, followed by the lower melting point waxes, leaving the desired deoiled wax product.

If the desired reduction in oil content of the wax is not attained by the sweating operation or by the use of solvents, further sweating or solvent treatment may be resorted to until a wax of sufficiently low oil content is obtained, which is usually less than about 0.5% by weight dependent on the ultimate use. Prior to or subsequent to the sweating step the wax may be fractionated to obtain a crude wax having the selected melting point range or ranges.

Finishing treatment of the deoiled wax to improve the color and odor of the wax is generally accomplished by treatment with a mineral acid followed by clay treatment.

Acid treating is customarily conducted with a strong mineral acid, preferably sulfuric acid, of a concentration from about 80% to about 100% by weight or more. The quantity of acid employed may vary from about 0.03 pound to about 0.5 pound per gallon of wax with a range of from 0.05 to 0.4 pound of acid being preferred. The acid-contacting step is usually carried out at elevated temperatures, for example, from about 150° to 200° F. Frequently, the wax is first contacted with a small amount of acid, the resulting formed sludge is withdrawn then the wax is again contacted with an additional amount of the mineral acid and the newly formed sludge is again drawn off.

The resulting acid-treated wax is generally neutralized with a neutralizing agent such as an aqueous solution of sodium hydroxide or potassium hydroxide, followed by one or more washings with water. Neutralization is also carried out at elevated temperatures.

The neutralizing agent may be employed in concentrated form such as from about 30° to about 50° Baume' aqueous sodium hydroxide.

The neutralized wax is further refined by treatment with an adsorbent clay such as bauxite, silica gel, activated clays and the like. The clay-treating step can be carried out by percolating the wax through a bed of the clay or by contacting the wax with the adsorbent clay to form a wax-clay slurry and filtering same. Operating conditions for the clay-treating step are conventional ones which are well known in the art.

It is also known to steam treat the acid-treated, neutralized wax fraction prior to the clay-treating step in order to improve the odor of the end product. In such a case the wax is vacuum-steamed using relatively small amounts of steam per barrel in the order of about from 5 pounds to 15 pounds of steam per barrel of wax.

I have now found that high quality fully refined petroleum waxes, particularly paraffin waxes, from a wax-bearing fraction of a paraffin base crude oil can be prepared by the hereinafter described process of the present invention.

I have now surprisingly found that the acid-treating and neutralization steps of the prior art refining process can be completely eliminated in refining a deoiled crude wax obtained from a wax-bearing fraction of a paraffin base crude oil by contacting said deoiled crude wax with steam in an amount of at least about 30 pounds of steam per barrel of wax and then clay-treating the resulting steamed wax with an adsorbent clay to obtain a refined wax having improved heat stability. The resulting refined wax product is of a quality at least equivalent to a refined paraffin wax obtained by subjecting the deoiled crude wax to refining treatment by acid-treating, neutralization, steam treating and clay percolating.

Waxes which may be purified in accordance with the process of this invention are the petroleum waxes including macrocrystalline paraffin waxes and microcrystalline waxes (petrolatum) which melt in the temperature range of from about 100° F. to about 200° F. or more. It is preferred, however, to use the paraffin waxes having a melting point temperature range of from about 120° to about 150° F. and particularly those paraffin waxes obtained from the waxy distillate fractions of paraffin crudes.

It is necessary to subject the waxy fraction obtained from the crude petroleum oil to a dewaxing operation and a deoiling operation before the wax is processed in accordance with the present invention. The dewaxing operation as well as the deoiling step can be carried out in any way of the conventional dewaxing and deoiling operations known in the art, such as, for example, those operations described briefly hereinabove.

As used in the specification and claims the term "deoiled crude wax" refers to a wax which has previously been removed from the petroleum crude oil fraction by a dewaxing operation, that is, by chilling the wax-containing oil fraction to a low temperature to affect separation of the wax from the oil, either with or without the use of conventional dewaxing solvents; then the separated wax is deoiled by a sweating operation or by the use of conventional deoiling solvents; and resweated or resolvent-deoiled until the oil content of the crude wax has been lowered to the desired amount, usually less than about 0.5%.

The resulting deoiled crude wax is then subjected to the refining treatment of the present invention.

An outstanding advantage of the process of the present invention over prior processes resides in the complete elimination of the steps of acid treating, neutralizing, washing and steaming in refining of paraffin waxes to obtain a purified wax product.

A further advantage is the considerable savings in time, materials and labor resulting from refining paraffin waxes by the novel process of the present invention. Additional advantages of the present invention will be readily apparent to those skilled in the art from the following detailed description of the invention.

The steam treating step of the present invention is carried out by first heating the deoiled crude wax to a temperature at least as high as the melting point temperature of the wax and maintaining the heated wax substantially at such an elevated temperature while contacting the melted wax with steam which is passed through the liquid wax in an amount of at least about 30 pounds of steam per barrel of wax. Preferably the steam is employed in an amount of from about 50 pounds to 100 pounds per barrel of wax, with about 50 pounds of steam per barrel of wax being most preferred for the best results.

Desirably the steam treating step is carried out in a pressure vessel wherein a pressure of less than atmospheric pressure is maintained for the duration of the treatment.

Satisfactory results have been obtained when the vessel has been maintained at atmospheric pressure but the use of subatmospheric pressures has produced a somewhat better end product.

The subsequent clay treating step of the present invention is carried out in a conventional manner using a conventional absorbent clay such as, for example, bauxite, bentonite, silica gel, an activated clay and the like.

Most satisfactory results have been attained using Porocel, the tradename for a commercial grade of bauxite.

Although clay treatment of the steamed wax may be conducted by slurrying the wax with the absorbent clay prior to filtering the wax-clay slurry it is preferred to percolate the steamed wax through a bed of clay so as to insure that the steamed wax is brought into intimate contact with the absorbent material.

The resulting filtered wax is the end product, a fully refined wax.

Following is a description by way of example of a method of carrying out the process of the invention.

EXAMPLE 7-4

Deoiled waxes obtained from a wax distillate fraction of a paraffin base crude oil were vacuum steam-treated then filtered through freshly reburned bauxite.

Details of the steam treating step and the filtration step are set forth in Table I below in columns under "Ex. 1," "Ex. 2," "Ex. 3," and "Ex. 4." For comparison, the same waxes were treated by the prior art acid process, treating conditions being also set forth in the table under columns headed "A," "B," "C," and "D."

*Table I*

| Grade of Wax, M.P., °F. | 122/124 wax | | 125/127 wax | | 130/132 wax | | 125/127 wax | |
|---|---|---|---|---|---|---|---|---|
| | Ex. 1 | A | Ex. 2 | B | Ex. 3 | C | Ex. 4 | D |
| Acid Treatment: | | | | | | | | |
| Charge, bbls | | 912 | | 790 | | 756 | | |
| Acid dosage, lbs./bbl.[1] | | 4 and 7 | | 4 and 7 | | 3 and 7 | | 4 and 7 |
| Sulfuric acid, percent | | 98 | | 98 | | 98 | | 98 |
| Treating temp., °F | | 195 | | 195 | | 190 | | 190-200 |
| Neutralization and Wash:[2] | | | | | | | | |
| Strength NaOH, Baumé | | 50 | | 50 | | 50 | | 50 |
| No. washes (water) | | 3 | | 3 | | 3 | | 3 |
| Steam Treatment: | | | | | | | | |
| Charge rate, bbl./hr | 40 | 135 | 40 | 135 | 40 | 135 | 20 | 135 |
| Charge temp., °F | 230 | 235 | 235 | 230 | 235 | 230 | 215-225 | 215-225 |
| Tower vacuum, inches Hg | 25 | 25 | 25 | 25 | 25 | 25 | 22 | 22 |
| Steam rate, lbs./hr | 2,000 | 2,000 | 2,000 | 2,000 | 2,000 | 1,800 | 2,000 | 2,000 |
| Lbs. steam/bbl. wax | 50 | 14.8 | 50 | 14.8 | 50 | 13.3 | 100 | 13 |
| Wax Outlet Temp., °F | 163 | 185 | 162 | 188 | 175 | 175 | | |
| Percolation: | | | | | | | | |
| Charge rate, bbls./hr | | | | | | | 6 | 6 |
| Change temp., °F | 150 | 150 | 150 | 150 | 150 | 150 | 145-155 | 145.155 |
| Reburned Porocel, tons | 12 | 12 | 12 | 12 | 12 | 12 | 12 | 12 |
| Thruput, bbls./ton | 30 | 30 | 30 | 30 | 30 | 30 | 30 | 30 |

[1] In the acid treating process, the wax was first contacted with from 3 to 4 pounds of sulfuric acid per barrel of wax; the resulting formed sludge was withdrawn, then an additional amount of acid (about 7 pounds/barrel) was added and the resulting formed sludge was withdrawn.
[2] In the neutralizing step, several washes were used.

Inspection tests on all the resulting products are presented in Table II below.

Inspection tests on the charge stock of Example 4 and Example "D" are also shown in Table II.

Table II
INSPECTION TESTS ON PRODUCT WAXES OF TABLE I

| Grade of Wax, °F | 122/124 wax | | 125/127 wax | | 130/132 wax | | | 125/127 wax | |
|---|---|---|---|---|---|---|---|---|---|
| Test | Ex. 1 | A | Ex. 2 | B | Ex. 3 | C | Charge | Ex. 4 | D |
| Melting point (E.M.P.) °F | 121 | 122.2 | 128.6 | 128 | 131 | 130.8 | 128 | 128 | 128 |
| Percent oil | 0.2 | 0.28 | 0.09 | 0.07 | 0.41 | 0.16 | 0.21 | 0.21 | 0.23 |
| Tensile strength, p.s.i | 190 | 240 | 325 | 329 | 367 | 348 | 250 | 255 | 255 |
| Modulus of rupture, p.s.i | 221 | 243 | 409 | 412 | 372 | 345 | | | |
| Blocking point, °F | <86 | <86 | <86 | <86 | 88 | 88 | 89.8 | 89.5 | 90 |
| Color, 18 in. Lovi | <0.5 | <0.5 | <0.5 | <0.5 | <0.5 | <0.5 | 5 (6 in.) | (W.W.) | (W.W.) |
| Odor and taste [1] | OK | OK | OK | OK | OK | OK | (unsat.) | (N.O.) | (N.O.) |
| Sunlight stability,[2] days | 35+ | 35+ | 35+ | 35+ | off at 30 | off at 30 | | | |
| Uninhibited stability: | | | | | | | | | |
| Days at 200° F | 6 | 4 | 13 | 6 | 13 | 8 | | 26+ | 23 |
| Hours at 250° F | 4 | 2 | 20 | 11 | 8 | 5½ | | 10 | 9 |

[1] Odor observations were conducted by a panel of five members.
[2] Sunlight stability was determined by placing samples of the fully refined waxes in stoppered, clear, glass, widemouth pint bottles in an area where they would receive direct summer sunlight. The odor of the samples was observed periodically. Failure was taken as the day on which the odor of the sample became objectionable.
(W.W.) Water white.
(N.O.) No odor.

Results of the inspection tests in Table II above indicate that the waxes finished by the intensive steaming process of the present invention are of a quality equivalent to the waxes by the prior art method. The strength properties, blocking characteristics, odor, taste and color of the severely-steamed waxes of the invention are shown by the data in Table II to be satisfactory. Moreover, the data show that waxes finished by the novel process of the invention are more heat-stable (uninhibited) than the waxes finished by the combination of acid treatment, neutralization, mild steaming and clay percolation.

Obviously, many modifications and variations of the invention, as hereinbefore set forth, may be made without departing from the spirit and scope thereof, and therefore only such limitations should be imposed as are indicated in the appended claims.

I claim:

1. A method of refining a deoiled crude petroleum wax obtained from a wax-bearing fraction of a paraffin base crude oil containing less than 0.5% oil comprising passing steam through said wax in liquid phase at relatively low temperature in an amount between about 30 and 100 pounds of steam per barrel of wax and at a vacuum of at least 22 inches of mercury, contacting the resulting steamed wax in liquid phase with an adsorbent clay, and recovering a refined wax characterized by improved heat stability.

2. A method of refining a deoiled crude petroleum wax according to claim 1 wherein said wax is steam treated in an amount of from about 50 pounds to 100 pounds of steam per barrel of wax and at a vacuum of from about 22 inches to 25 inches of mercury.

References Cited in the file of this patent
UNITED STATES PATENTS

| | | |
|---|---|---|
| 1,921,860 | Bahlke | Aug. 8, 1933 |
| 2,441,202 | Maier et al. | May 11, 1948 |
| 2,642,380 | Horne et al. | June 16, 1953 |

OTHER REFERENCES

Chemical Engineering, Feb. 10, 1958, pages 116–119.